United States Patent [19]

Webb et al.

[11] Patent Number: 4,577,060

[45] Date of Patent: Mar. 18, 1986

[54] PAGING NETWORK

[75] Inventors: Robert E. Webb, Roswell; Eugene H. Kreeft, Sugarhill; Jack T. Arnold, Norcross, all of Ga.

[73] Assignee: BBL Industries, Inc., Atlanta, Ga.

[21] Appl. No.: 495,803

[22] Filed: May 18, 1983

[51] Int. Cl.[4] .......................... H04Q 7/04; H04M 3/42
[52] U.S. Cl. ................. 179/2 EC; 179/18 BF
[58] Field of Search .............. 179/2 E, 2 EB, 2 EC, 179/18 BF, 2 DP, 18 BE, 7.1 R; 340/311.1, 825.44–825.48

[56] References Cited

U.S. PATENT DOCUMENTS

| 3,836,726 | 9/1974 | Wells et al. | 179/2 EC |
| 4,178,476 | 12/1979 | Frost | 179/2 EC |
| 4,262,171 | 4/1981 | Schneider et al. | 179/18 BF |
| 4,313,035 | 1/1982 | Jordan et al. | 179/18 BE |

FOREIGN PATENT DOCUMENTS 0040954  12/1981  European Pat. Off. ......... 179/2 EC 1450971   2/1973  United Kingdom .

OTHER PUBLICATIONS

Radio Pagers Expand Horizons, from High Technology/Mar. 1983, pp. 44–47.

Primary Examiner—W. J. Brady
Attorney, Agent, or Firm—Willian Brinks Olds Hofer Gilson & Lione Ltd.

[57] ABSTRACT

A plurality of paging terminals each serving a locality are connected by a multi-drop communication link to establish an inter-regional paging network. The terminals observe a token passing protocol to provide for an orderly sequential use of the communication link. Down terminals are skipped in the sequence. The lack of activity on the communication link will cause a startup timer in the terminal to reset. Retransmissions are requested by a terminal from another terminal which is on-line when the terminal fails to receive a message in a particular round through the network.

34 Claims, 14 Drawing Figures

FIG. 1.

(PRIOR ART)

| START TEXT | SOURCE ADDRESS | DESTI-NATION ADDRESS | BYTE COUNT | CODE | PAGES | CHECK SUM |
|---|---|---|---|---|---|---|

FIG. 4B.

| PAGING GROUP ADDRESS | BYTE COUNT | PAGER TYPE | FREQUENCY IDENTI-FICATION | PAGER ADDRESS | DISPLAY INFORMATION |
|---|---|---|---|---|---|

FIG. 4C.

```
CODE
 0      PAGES AND TOKEN
 1      PAGES ONLY (RESPONDING TO RETRANSMIT REQUEST)
 2      REQUEST FOR RETRANSMIT
```

FIG. 5.

| START TEXT | SOURCE ADDRESS | DESTI-NATION ADDRESS | BYTE COUNT | CODE | CHECK SUM |
|---|---|---|---|---|---|

PAGING NETWORK

BACKGROUND OF THE INVENTION

This invention relates to a network for providing inter-regional or nationwide paging by interconnecting terminals, each of which provides local paging service.

The use of paging to contact a person who is away from his home or business is gaining increased acceptance. The availability of paging began locally. Paging service can be provided by a locality if it has a paging terminal. The terminal can be contacted through the telephone system by a person wishing to reach a subscriber carrying a pager. To reach a subscriber, a person would dial a number which accesses the terminal. The telephone number identifies the subscriber to be contacted with a page. Depending upon the system, provisions may be made for sending coded messages, voice messages or merely beeping the subscriber. After the terminal has received a page, it transmits a sequence of tones or binary digits over a radio channel. Each pager has a unique sequence which it recognizes. Upon recognizing the unique sequence of tones or binary digits, the pager will be beeped. It may also have a voice message, a numeric display or an alpha display in addition to the beep.

The memory of the terminal must store the information which identifies the pager corresponding to each individual phone number. The memory must also store information specific to each pager. This includes data identifying the type of pager, the tone combination (sequence) for addressing the pager and, for billing purposes, the address of the subscriber and a record of the time used in making pages.

There has been in interest in expanding the availability of paging to beyond the local area served by a single terminal. Several methods have been proposed for providing such a paging system. One method for expanding the coverage from a single terminal to a second terminal would be for the two terminals to share time on each of their transmitter systems. A control line would be run from each terminal to the transmitter in the other locality. An external clock would be necessary for allocating the time so that each terminal could share the transmitter time on each of the transmitters. This system has the obvious disadvantage of delaying or interrupting the local paging service while the other station is using the transmitter to send out its pages. Furthermore, expansion beyond a couple cities would require an extensive system of expensive cables.

Another method which could be used to expand paging coverage beyond a single locality would be to provide each customer with more than one telephone number which could be dialed to reach the subscriber. Each phone number would call up a different terminal in a different locality. At each terminal only one number would need to be added to the data base for each inter-regional subscriber to handle the inter-regional paging. This method would however provide many disadvantages to the persons using the system. A person would have the inconvenience of having to remember more than one telephone number. Furthermore, the out of the area numbers would generally be an expensive long distance phone call.

Figure 1:
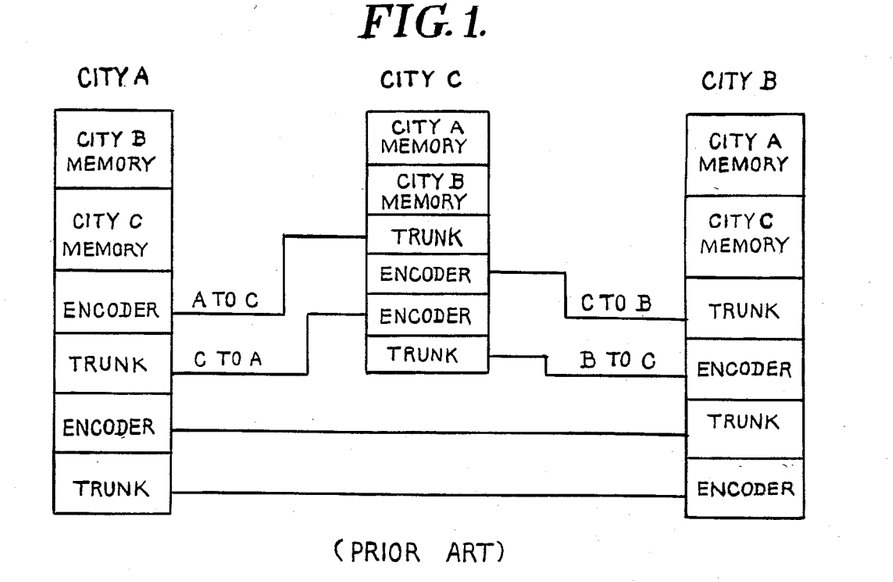
FIG. 1 is a schematic drawing of a prior art inter-regional paging system.

The most commonly used system for connecting paging terminals from several localities is to add a special encoder, trunk circuits and data base memory to the terminal at each of the localities. Pages received from an outside locality may be mixed into the gueue of the receiving locality's transmitter system. Thus, the inter-regional pages do not interrupt the normal flow of the system. In this method, the customer conveniently needs only to dial one number to effect an inter-regional page. If each terminal in the network of terminals has sufficient voice recording mechanisms available, tone and voice as well as tone only pages may be sent across the link between the localities. When more than two localities are linked together, a difficulty arises in this system. As shown in FIG. 1, when three cities are connected, each of the three terminals at the different cities must contain two encoders and two trunk lines to the other cities as well as additional memories for each terminal in the system. The trunk lines are expensive phone line circuits. They allow uninterrupted traffic flow between the localities. As the number of localities increases, the cost and manageability of such a networking scheme would be rather unruly.

Another proposal for providing inter-regional or nationwide paging is disclosed in U.S. Pat. No. 4,178,476 (Frost). In the Frost system, a master transit station can communicate pages to and from several base stations. This hub and spoke arrangement has several problems. In setting up a system among various localities, political problems may arise in the determination of which locality is going to be the master terminal. The communications company located at the master terminal would financially benefit from the increased use of its terminal to receive and send out inter-regional pages. Furthermore, each of the base systems would have the burden of paying for a communication line to hook up with the master terminal. The task of choosing a master terminal might thus lead to political squabbles between the various localities and common carrier companies.

Another disadvantage with the Frost system would arise if the master terminal should become inoperative for some reason. If this should happen the entire inter-regional paging system would be brought to a standstill. The integrity of the master terminal would be essential.

Plans are being made by the Federal Communications Commission to set aside the 900 MHz band for exclusive use by nation-wide paging. When this system is implemented, each subscriber will have the burden of obtaining a new pager which receives signals in the 900 MHz band. In addition, new paging terminals will be needed throughout the nation. Although this may eventually become an accepted nation-wide paging system, it may take several years before it can be implemented.

SUMMARY OF THE INVENTION

The present invention is directed to a system for interconnecting paging terminals, each servicing a different locality to form an inter-regional or national paging network. A communication link is shared by all of the terminals in the network. The communication link is preferably a half duplex multi-drop link. As described in detail below in the preferred embodiment, each of the terminals follows a token passing protocol to effect an orderly sequential use of the communication link. Each of the terminals on the communication link will receive the hypothetical token at its turn. When a terminal gets the token it will make sure that in the past round through the network, it has received messages from each of the other terminals operating on the communication link. Then, it will send its pages over the communication link to all of the other terminals in the network. The token passing protocol provides for skipping terminals which have been recognized as inoperative and for retrying to contact such inoperative terminals after a predetermined number of rounds through the whole network.

Each terminal can recognize the lack of activity on the line. When this happens, the terminal resets itself and after a predetermined start-up time it will take the initiative to use the communication link to send out its pages. Each terminal has a different start-up time so that only one will be first to take the initiative. Once a message is sent out on the communication link, the other terminals will effectively turn off their start-up timers and the sequence through the network will commence, beginning with the terminal which took the initiative. If some terminals are cut off from other terminals by a break in the communication link, a separate and independent inter-regional network can be initiated by this cooperation between the recognition of no activity and the start-up timers. Thus, two networks could be operative at the same time until the break is repaired.

More particularly, the present invention is directed to a networking module which may be added to a local paging terminal. The networking module gives the terminal the ability to operate in an inter-regional network of the present invention. The networking module includes a modem, a serial input/output device, a memory, a parallel input/output device, and a central processing unit (CPU). The CPU is programmed to observe the token passing protocol in an inter-regional paging network. By incorporating this networking module into a local paging terminal, a paging terminal of the present invention results. Such a terminal may be used to perform local and inter-regional paging.

According to the present invention, paging terminals and pagers presently in use at the present paging frequencies may all be used to perform inter-regional paging. By adding a networking module to existing local paging terminals, these terminals may be connected with a communication link to provide inter-regional paging at a low cost. All of the terminals which join to form a network would be able to share the cost of a multi-drop communication line connecting these terminals. Each terminal under the token passing protocol shares an equal status with all of the others, thus there should be no political quarrels as may be encountered in less equal arrangements.

According to the system of the present invention, a break in the multi-drop line would not paralyze the system completely. It would still be possible for terminals on either side of the break to communicate with one another while the line is being repaired.

Other objects and advantages of the invention will become apparent during the following description of the presently preferred embodiments of the invention taken in conjunction with the drawings.

DETAILED DESCRIPTION OF THE PREFERRED EMBODIMENTS

INTER-REGIONAL PAGING NETWORK

Figure 2:
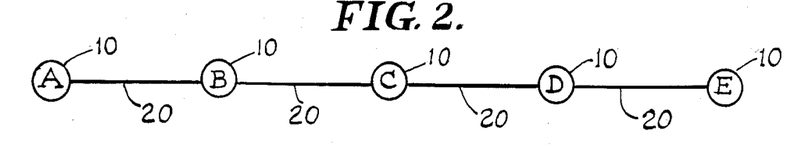
FIG. 2 is a functional diagram of the network of the present invention showing the interconnection of the terminals in the network.
Figure 3:
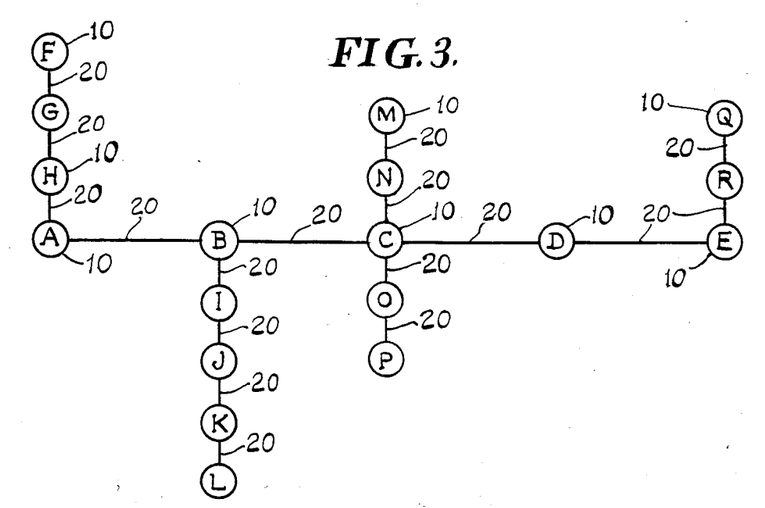
FIG. 3 is a functional diagram of a network of the present invention which interconnects several other networks of the present invention.

Referring now to FIGS. 2 and 3, diagrammatic representations of two embodiments of an inter-regional paging network of the present invention are illustrated. In order to achieve an inter-regional paging network of the present invention it is first necessary to provide a number of local paging stations 10. Each local paging station has a paging terminal to service its own geographic area. To achieve an inter-regional paging network, the local paging stations 10 are connected by a multi-drop communication link 20. On a multi-drop communication link 20, all of the terminals receive each of the messages which is transmitted over the link. One familiar example of a multi-drop communication link is a telephone party line. Party lines were more commonly used in the early days of the telephone. Today, there are a variety of communication means which may be used to form the link including cable, satellite, fiber optics or microwave communications. The presently preferred communication link 20 is a two wire half duplex data conference bridge. Over this communication link, messages may be received or transmitted but may not travel uninterrupted in both directions at the same time.

FIG. 2 shows a network connecting five different local paging stations 10. In FIG. 3, several different paging networks are shown. Some of the stations 10 in FIG. 3 belong to more than one paging network. For example, station B belongs to the network of ABCDE and network BIJKL. Paging station C belongs to network ABCDE and to network MNCOP. Thus, it is possible for a page to be passed from one network to another to extend the geographical reach of the system. For example, a page initiated at station F can be aired from station Q. It is only necessary that the initial message at station F contain address information which identifies Q as a station from which it is desired that the page be transmitted. When the message is sent out over the FGHA network, station A is equipped to recognize that this is a page which should be sent out over network ABCDE to station E. Station A passes the message along through network ABCDE to station E, then station E passes the page along through network QRE to station Q.

To accomplish the inter-regional paging of the present invention, it is not necessary to change the pagers held by customers in the local paging areas. Pages will be sent out over the same frequencies as with the local paging. It is only necessary that each customer submit, for input into his local paging terminal, information identifying the areas or particular stations over which the customer wishes his pages to be aired. This information is used to define the paging group address which will be included with the subscriber's pages to identify the stations which will transmit the subscriber's pages over the air.

The inter-regional paging network is made possible by the use of a token passing protocol over the communication link 20 which provides for an orderly sequential use of the communication link. Only one local station may send out a message on the communication link at a time. The station with the "token" controls the use of the communication link. The "token" is passed in order from one station to the next, thus giving each station a chance during each round through the network to send its pages out onto the network communication link 20.

Each station which receives the "token" will make sure that since the last time it had the "token", it has received a message from each of the other stations which are on-line in the network. Each station keeps a record of the stations from which it has received messages in each round through the entire network. When a station receives the "token", it will determine which, if any, stations from which it has not received a message. It may then request a retransmission from that station without giving up the "token". When the local station with the "token" has received messages from all of the stations which are on-line, it will send out its own message and pass the "token" on to the next terminal in sequence in the network.

A terminal that passes the "token" makes sure that the next terminal receives the "token" by waiting a certain amount of time for a response in the form of a message from the next terminal. If the next terminal should fail to receive the token bearing message, the sending terminal will retransmit its message. The number of retries which will be attempted is predetermined by the operator at the station who programs the terminal to attempt a certain number of tries before giving up. If the repeated transmission of a message is unsuccessful, then the station will skip over the terminal which it could not make contact with . It will then attempt to pass the "token" to the next station in the network following the inoperative or "down" terminal. To save time, a down terminal will not be tried the next time through the network. In fact, in the preferred embodiment, ten rounds through the network are taken before an attempt is made to reach the down terminal.

Figure 4A:
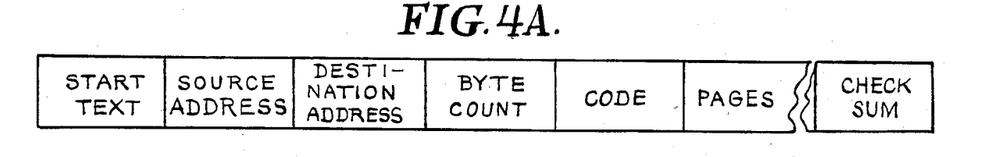
FIG. 4A is a diagrammatic representation of a message sent by a paging terminal in the network of the present invention.

In FIGS. 4A–C and 5, the various message formats used in the preferred network for transmissions on the communication link 20 are illustrated. Referring now to FIG. 4A, each message begins with a byte of information identifying the start of the message. This byte is called "start text." The next item of information on the message is the source address. Each local station on a network must have a different address for identification purposes. When a terminal receives a message, it will set a flag in its memory indicating that it has received a message from the terminal identified in the source address. In this way, the terminal will have a record of which terminals it has received messages from so that it can determine from which terminals it missed receiving a message. Then retries may be requested from the missed terminals.

Figure 4B:
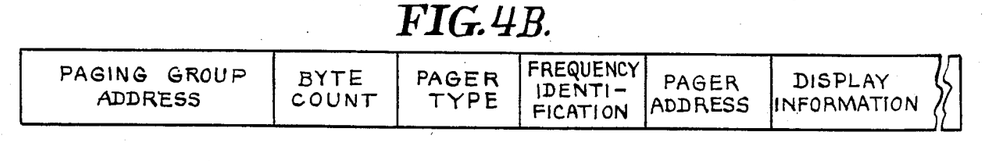
FIG. 4B is a diagrammatic representation of the pages portion of the message of FIG. 4A.
Figure 4C:
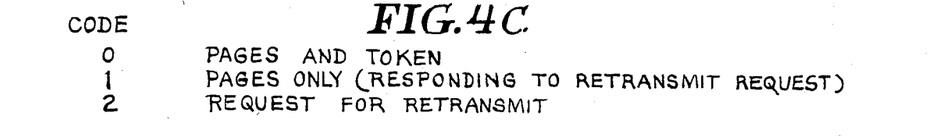
FIG. 4C is a table defining the various possibilities for the code portion of the message of FIG. 4A.
Figure 5:
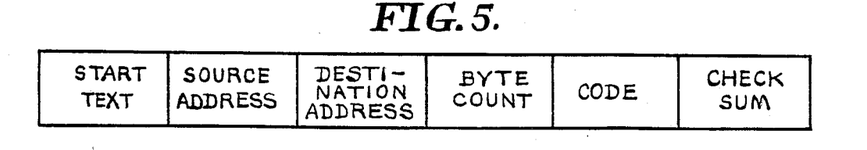
FIG. 5 is a diagrammatic representation of a message sent by a terminal in the network of the present invention requesting a restransmit.

To understand the type of message, a code is included within the message at a location shown in FIGS. 4A and 5. In FIG. 4C, the various codes used by the network of the present invention are shown. When a station is sending its pages and passing the "token" to the next station in the network it will give a code of 0. When the pages are being sent in response to a request for a retransmit, the code 1 is used. When a station has received a "token" and is making a request for a retransmit it will send a message with a code of 2. This request for a retransmit will not contain any pages. A request for a retransmit message is illustrated in FIG. 5.

The piece of information following the source address in a network message is the destination address. The station identified in the destination address is the station with responsibility for sending out the next message on the communication link. This will also be the station with the "token" if the message is passing the "token" or responding to a retransmit request. If the message is a request for a retransmit then the source station retains the "token" and the destination station will be responsible for sending a retransmission.

After the destination address, a byte count appears in the message. This gives a count of the number of bytes of information in the message from this point until the final piece of information of the message is reached. The last segment of information in the message is the check sum. The byte count is necessary since the length of the message will vary depending on how many pages it contains and the length of the pages. The byte count enables the receiving terminals to determine which byte is the check sum.

The check sum is the final piece of information. This allows for a known method of checking the accuracy of the reception of the message. The preferred verification method is called cyclic redundancy check (CRC). A known sequence of adding together and rotating each of the bits in the message is used to produce the check sum. The receiving terminal performs the sequence of operations on the bits as they are received. At the end of the message, the results are compared with the check sum to verify the accurate reception of the message.

A message passing the "token" or responding to a retransmit will appear as in FIG. 4A and will include a number of pages. Each page will contain the information diagrammed in FIG. 4B. The page begins with a paging group address. This address identifies all of the stations over which the page will be aired. A terminal recognizing that it is one of the terminals identified by the paging group address, will extract the page and add it to the queue of pages to be aired.

A byte count follows the paging address. This provides the length of the remainder of the page so that the terminal can identify the end of the page. The byte count is followed by a pager type which identifies whether the pager being called is a five tone pager, a two tone pager, a digital pager, or some other variety of pager. Next, a frequency identification provides the RF frequency over which the message should be transmitted to reach the pager. Following this, a pager address identifies the pager by its unique cap code (tone sequence). The terminal will use the cap code to cause the correct pager to beep. Finally, the display information is provided in the message. Some pagers come equipped with displays which can print out a message when the pager is being beeped. The message may include a number to call or provide some other message.

Figure 6:
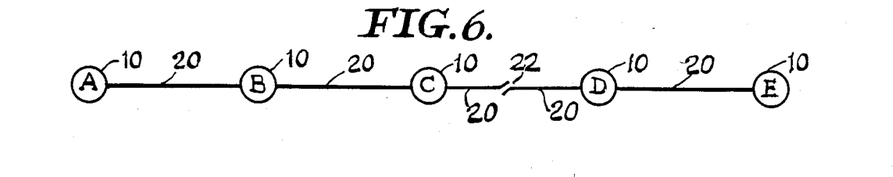
FIG. 6 is a functional diagram of a network of the present invention in which a break has occurred on the line.

According to a feature of the present invention, the network can continue to function in a limited capacity even if a break should develop in the communication link 20. Diagrammatically, this is shown in FIG. 6 where a network of local stations A, B, C, D and E suffers a break 22 in the communication link between stations C and D. To illustrate how the network reacts to a break in the line, assume that when the break occurs station C has possession of the "token." Assume also that Station D is the next station in line. Station C will attempt to transmit a message which passes the "token" to station D. However, station D will be unable to receive the transmission. Since no terminal will produce a message after C attempts to give the "token" to D, station C will continue to try to send the message for a predetermined number of times. If it continues to receive no response, it will try to send the "token" along to the next station in order, station E. Station E will also be unable to receive the "token" and thus C will send the "token" to station A. Station A will then send out a message which passes the token to station B. In this manner, a network continues to function between stations A, B and C.

The present invention further includes means to reactivate a network between stations D and E while the break 22 exists in the communication link 20. The terminal at each station includes a no activity timer for recognizing a lack of activity on the communication link 20. After a certain predetermined amount of time if a terminal does not receive any messages on the communication link it will reset itself. When a terminal resets, it goes through an initial start-up routine. Each terminal has a start-up timer which gets set to a predetermined time period. The time period is unique for each particular terminal. In the preferred embodiment, the time period is determined by the address of the terminal. Since each of the terminals has a different time period for start-up, the one with the shortest start-up time will activate first. When its time runs out, it will send a message with its pages and with the "token" to the next terminal in line. Once the stations on the communication link 20 receive this first message, they will effectively turn off their start-up timers and the regular message operation will commence on the communication link. In the example at FIG. 6, stations D and E will not receive activity on the link. This will cause both of their no activity timers to time out. They will both reset and start their start-up timers. The one with the shorter start-up time will be the one to send out a message passing its pages and "token" along. When station E obtains the "token", it will try to pass the "token" to A, B and C but will be unsuccessful. Thus, a network will be setup between stations D and E.

When the break 22 is repaired, the network will once again include all five of the stations. The second "token" will automatically disappear, since a terminal which was about to pass the "token" will not do so if it is interrupted by receiving a message from another terminal. The first "token" to be passed on the repaired network will take precedence and control the activities on the link thereafter. In the unusual circumstance where the two "tokens" are passed simultaneously on the link, the transmissions will be garbled causing the terminals to reset and enter a start-up routine. The start-up routine will result in a single token since each terminal has a different start-up time period.

According to another feature of the present invention, one of the stations in the network can be devoted exclusively to the function of providing the billing for the network member stations. Each of the individual member stations can be freed of the chore of providing their own billing and the expense of a billing terminal can be shared by all of the members in the network. The terminal would collect information from each of the terminals preferably during a lull period in paging activity, such as during the very early morning. When the billing terminal receives the token on the network, it would be able to send out a message specially coded to request billing information. When all of the billing information has been collected the terminal can pass the "token" along. Since all of the billing information is collected in a single terminal, great freedom is available for determining a desirable formula for appropriating the cost of using the processing time and transmitter time at the various stations. Bills can be prepared for the individual customers as well as between the various carriers operating the different stations.

Precautions should be taken to avoid paging the wrong pager because of a duplicated cap code. The paging network of the present invention allows the subscribers to receive pages in a specified geographic area including any number of the areas covered by the stations on the network. A person wishing to initiate a page merely has to dial a single phone number to get the page transmitted over the entire geographic area subscribed to by the owner of the pager. Occasionally, an error may occur and two pagers from different localities may contain the same cap code or pager address. It is therefore desirable that each station has means for detecting that a pager address obtained through the network accesses a cap code which is identical to one of the codes used by a local pager. Then the issuance of a page can be prevented. Of course, it is preferred that the stations synchronize their provision of cap codes to the various pagers so that such duplication is avoided.

THE PAGING TERMINAL

Figure 7:
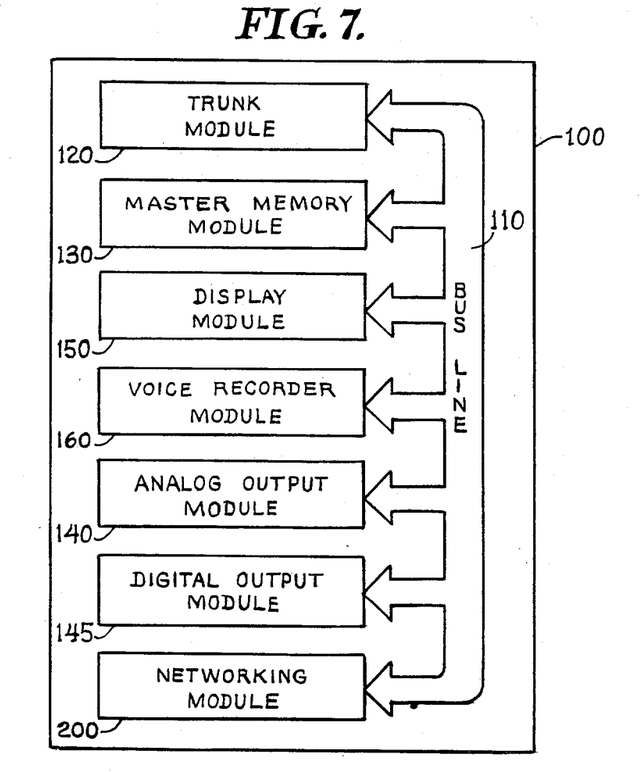
FIG. 7 is a block diagram of a paging terminal of the present invention.

Referring to FIG. 7, a block diagram of a preferred embodiment of the terminal 100 provided at each paging station is shown. The terminal 100 of this embodiment comprises a paging terminal known in the art for use in local paging with the addition of a networking module 200. The known local terminal includes a number of independent microprocessor controlled hardware modules housed in one or more electrical equipment racks and linked to one another by an internal data bus 110. Each of the modules performs specific functions. BBL Industries, Inc. produces several models of local paging terminals including the System III, System IV, System IV-X, System VI and System VI-X, each of which conforms to the architecture described below. A paging terminal for use in an inter-regional paging network of the present invention results from adding a networking module of the present invention to any of these local paging terminals.

The control of information transfer along the data bus line 110 is for the most part undertaken by a master memory module 130. The master memory module 130 is also responsible for much of the storage in the terminal 100. This module keeps the records for each subscriber. The stored data correlates the telephone number to the pager type and the radio channel to be used for contacting that subscriber's pages.

A trunk module 120 interfaces the telephone lines with the rest of the terminal 100. The trunk module 120 decodes the address of the pager to be beeped and provides ring back, busy back and other supervisory signals to the calling party. The master memory module 130 supplies the trunk module 120 with the stored information corresponding to the subscriber identified by the phone call. The trunk module 120 combines this information with any paging message received in the phone call to create a paging packet.

The paging packet is directed on the bus line to one of three output modules. The three output modules are included for accommodating the variety of pagers in use. An analog output module 140 converts the pager addresses in the paging packets into the corresponding tone sequences and controls a radio transmitter at the station. The tones are sent in analog form by the transmitter. For pagers which read digital signals, a digital output module 145 is provided for converting the pager address within paging packets into a sequence of bits corresponding to the appropriate tone sequence. The digital output module controls the transmitter for sending out its digital page. A voice recorder module 160 will record a voice message for pagers which have a voice reproduction capability. After the pager has been beeped, the voice recorder module 160 will control the transmission of the stored voice message for reproduction by the pager.

A display module 150 interfaces with a CRT which is available for use by the operator at the paging station. The operator can input data through the CRT via the display module 150. The data would include the phone number identifying the subscriber, the pager type and an identification of the areas over which the subscriber desires the pages to be broadcast and other information particular to the subscriber. The operator would also input information such as setting the number of retries which may be attempted, enabling the network, informing the terminal when a new terminal is being added to the network and setting the time periods for the various timers.

When a page is initiated by a telephone call, the trunk module 120 answers the call and decodes the special information sent by the phone company which identifies the phone number which is being called. The master memory module 130 supplies the trunk module 120 with the subscriber record associated with the particular phone number. After receiving the subscriber record, the trunk module 120 determines the pager type, i.e., whether it is tone only, voice display, alpha display or some other type. The trunk module 120 can then process the call to obtain the appropriate information to create a paging packet. If the pager has a voice display, a voice message will be stored in the voice recorder module 160. Upon completion of the call, the master memory module 130 directs the use of the bus 110 to move the paging packet from the trunk module 120 to either the analog output module 140, or the digital output module 145 or the voice recorder module 160. Each output module converts the pager address in the paging packet into the appropriate tone sequence and puts the paging information in a queue for the appropriate radio channel. Then on a first-in-first-out basis the appropriate tone sequence along with the message information is sent to the transmitter. The page is then broadcast to the locality served by the terminal 100.

In the terminal 100 of the present invention, the networking module 200 is present for sending out pages over the inter-regional network. The networking module 200 comes into use when the subscriber record in the master memory module 130 indicates that the page is to be broadcast in other localities. When the trunk module 120 completes a call it will determine whether the page is to be transmitted both locally and inter-regionally through the network. If it is to be sent out through the network, the master memory module 130 then moves the paging packet of information to the networking module 200 as well as one of the output modules. The appropriate output module transmits the page locally and the networking module 200 produces a message containing the paging packet which it sends out over the network communication link 20 when its turn to transmit arises in accordance with the token passing protocol. In the terminals at the other stations along the network, the paging packet of information is examined to determine if the page is to be transmitted in their locality. If it is to be transmitted, the information is forwarded to the appropriate output module in the terminal. Otherwise, the information is disregarded.

NETWORKING MODULE

Figure 8:
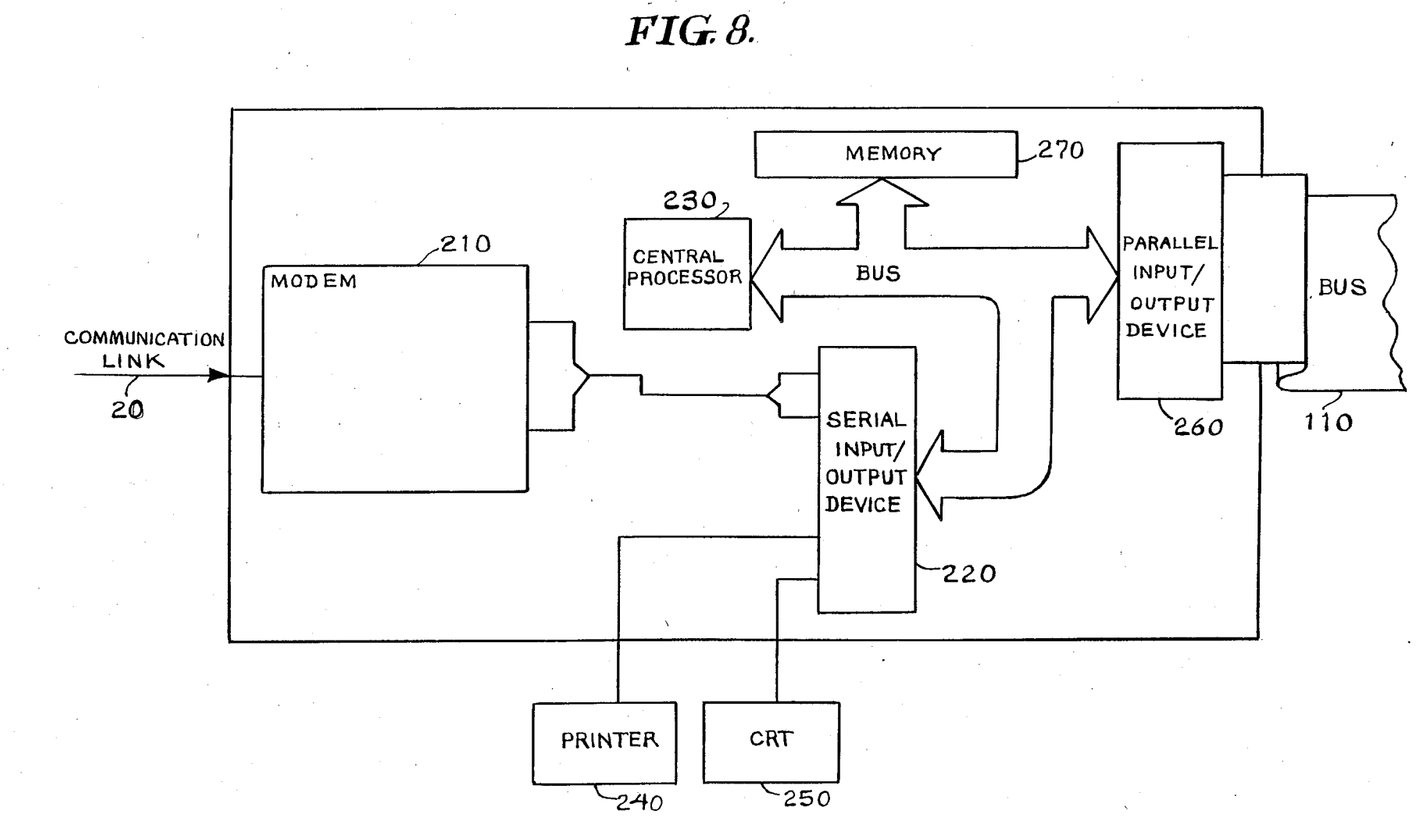
FIG. 8 is a schematic diagram of a first embodiment of a networking module of the present invention.
Figure 9:
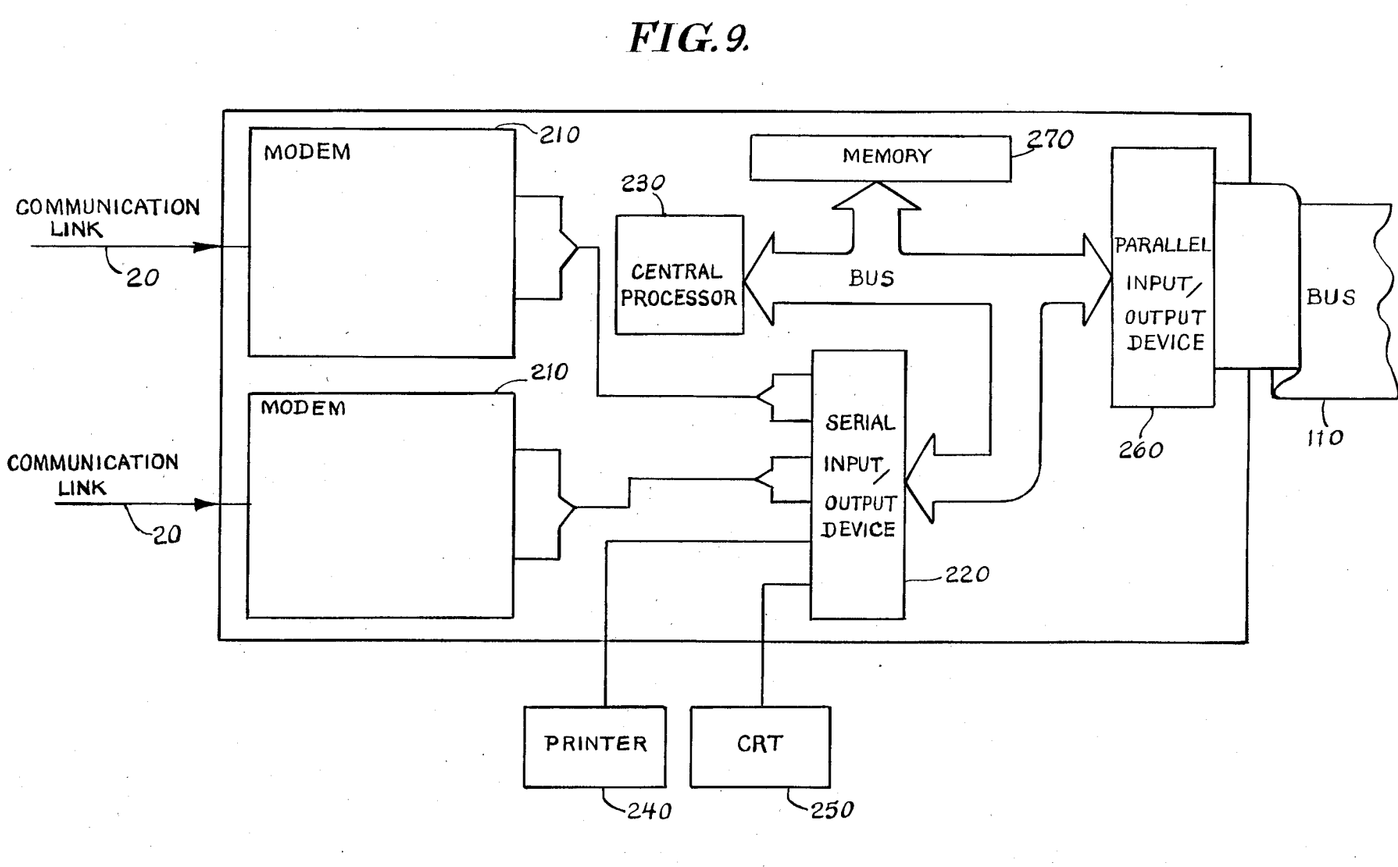
FIG. 9 is a schematic diagram of a second embodiment of the networking module of the present invention.

Two embodiments of the networking module 200 are shown in FIGS. 8 and 9. The networking module 200 includes a modem 210 for converting the digital information produced by the networking module 200 into frequency or phase shift information which can be sent along the communication link 20. The modem 210 also operates in the opposite direction to convert frequency or phase shift data from the communication link 20 into digital information for processing by the networking module 200. The modem 210 brings a carrier signal up on the communication link 20 when it turns to transmit arises. Messages are sent out on the carrier signal. In the preferred networking module 200, the modem 210 performs frequency shift keying modulation in the digital information for transmission along the communication link 20. The presently preferred modem 210 is a Bell 202 modem. The networking module 200 would need one modem 210 for each network to which it belongs. The networking module 200 shown in FIG. 9 contains two modems 210. This would be necessary in the terminals at the paging stations shown in FIG. 3 identified as stations A, B, C, and E, since each of them belongs to two networks. Each moden connects directly with the network's communication link 20.

In general use, modems are set so that their own transmissions are squelched and are thus not received. However, in the networking system of the present invention, the modems 210 are set so that the transmissions sent out on the communication link 20 by the modems 210 are not squelched. Thus, a modem 210 will receive its own transmission. This allows for a diagnostic routine in which the networking module 200 compares the bytes in each transmission sent out with the bytes as they are received to ensure that they are the same. Transmission will then continue if this diagnosis checks out properly. If a faulty transmission is detected, the operator will be notified and the networking module 200 will reset itself.

Each terminal must have a different address for identification purposes. The address of the terminal is determined by an eight bit DIP switch located on the modem 210. The address is also used to determine the length of the start-up timer time period for the particular terminal 100.

The signals sent along the communication link 20 are sent out seriatim. Therefore, connected to the modem 210 is a serial input/output device 220. The presently preferred serial I/O device 220 is a Zilog SIO, model Z8440. The serial I/O device 220 interfaces between the modems and a central processor unit (CPU) 230 within the networking module 200. The serial I/O device 220 is also used to provide serial information to a printer 240 and a CRT display 250. The presently preferred printer 240 and CRT 250 are a Microline u82A and an ADDS Viewpoint, respectively. The printer 240 and CRT display 250 allow communication back and forth between an operator and the networking module 200. The CRT 250 may be the same one used to access the display module 150, but to use it on the networking module 200 it would have to be disconneted from the display module 150 and connected to the networking module 200. If needed on the display module 150, the connection would have to be changed back. To avoid the inconvenience of changing the CRT connection, two CRT's could be used in conjunction with the terminal 100. One would be connected to display module 150 and the other to networking module 200.

When the serial I/O device 220 receives transmissions from a modem 210, it will translate the serial signal information into parallel form for the CPU 230. It will also in the opposite direction translate parallel information from the CPU 230 into serial information for transmission by the modem along the communication link 20. The serial information sent to the modems, printer and CRT display are formatted with starts and stops for synchronization and recognition by those devices. In the embodiment of FIG. 9, a quad serial I/O device 220 is used to handle the two modems 210, the printer 240 and the CRT display 250.

Communication between the CPU 230 and the bus line 110 of the terminal 100 is performed by a parallel input/output device 260. The presently preferred parallel I/O device 260 is a Zilog PIO, model Z8420. The presently preferred CPU 230 is a Z80 microprocessor, model Z8400. The CPU 230 controls the interrupt routines for handling the transfer of information from the input/output devices into a memory 270 in the networking module 200 or out to the bus 110 or modem 210. It is within the CPU 230 that the program for performing the token passing protocol of the present invention is located. The memory 270 is included within the networking module 200 for use by the CPU 230. It is preferable that the memory 270 be a nonvolatile random access memory. The preferred RAM is a battery backed-up, CMOS memory.

NETWORK IMPLEMENTATION

Figure 10A:
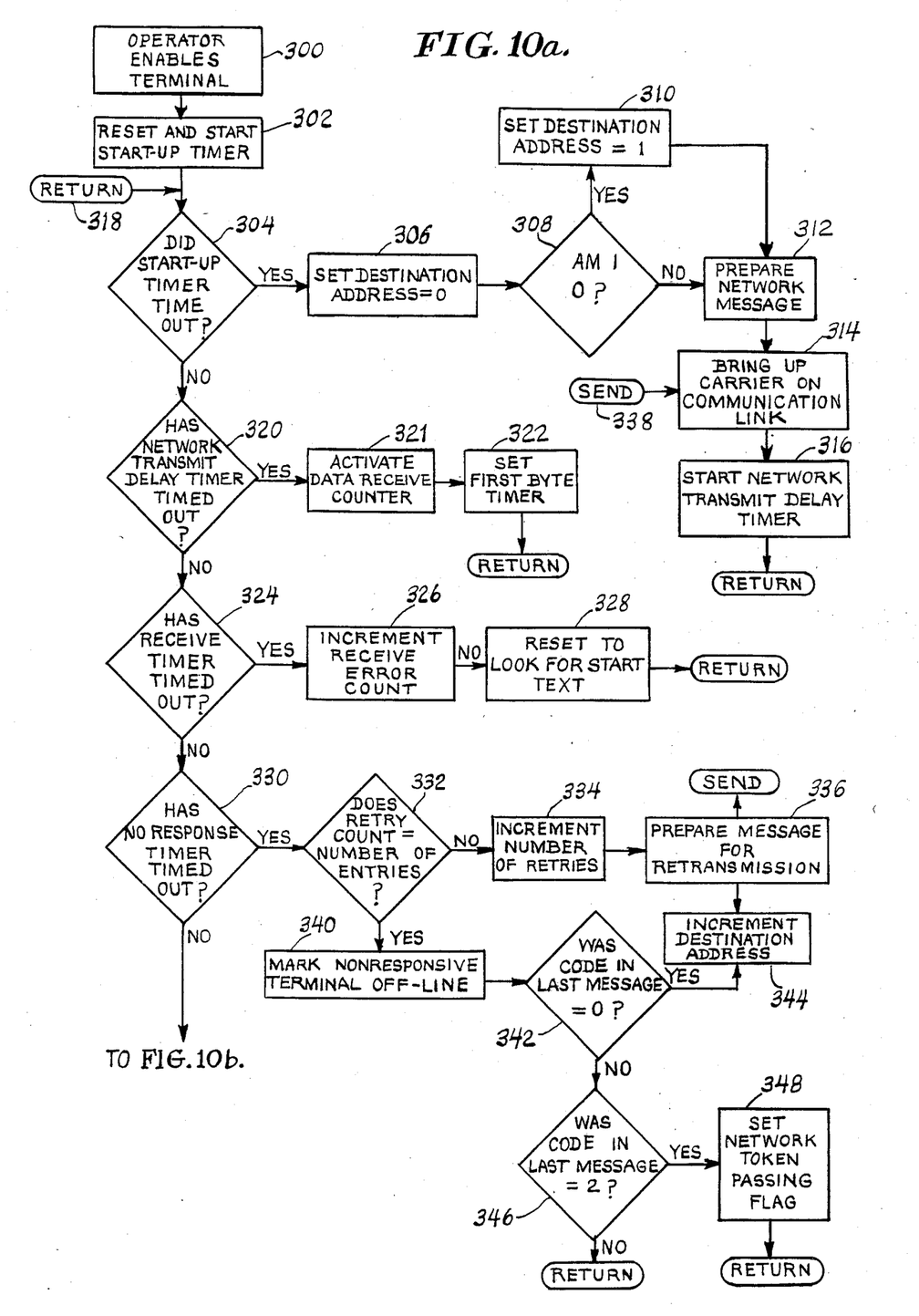
FIG. 10a–c is a flow chart implementing a token passing protocol of the present invention.
Figure 10B:
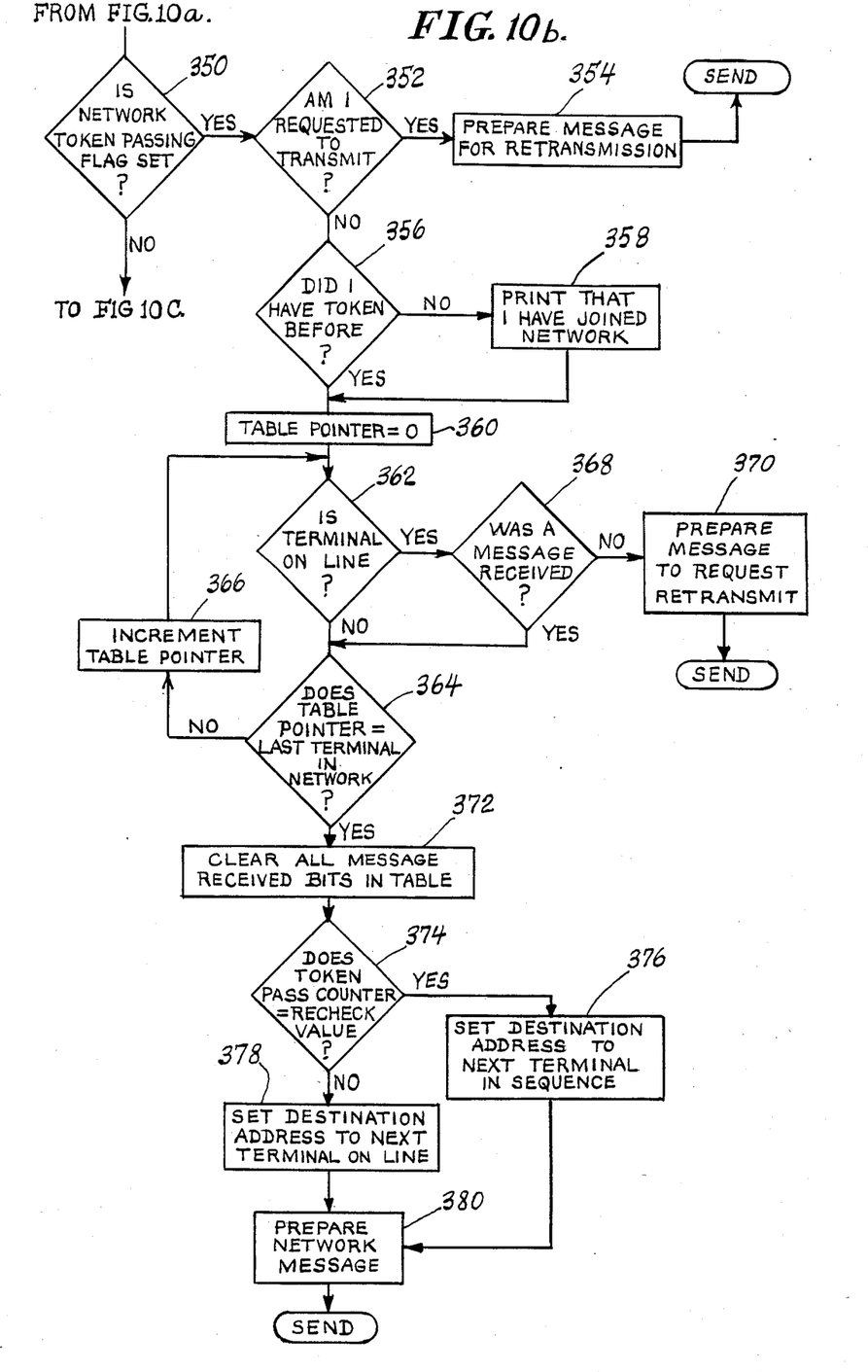
Figure 10C:
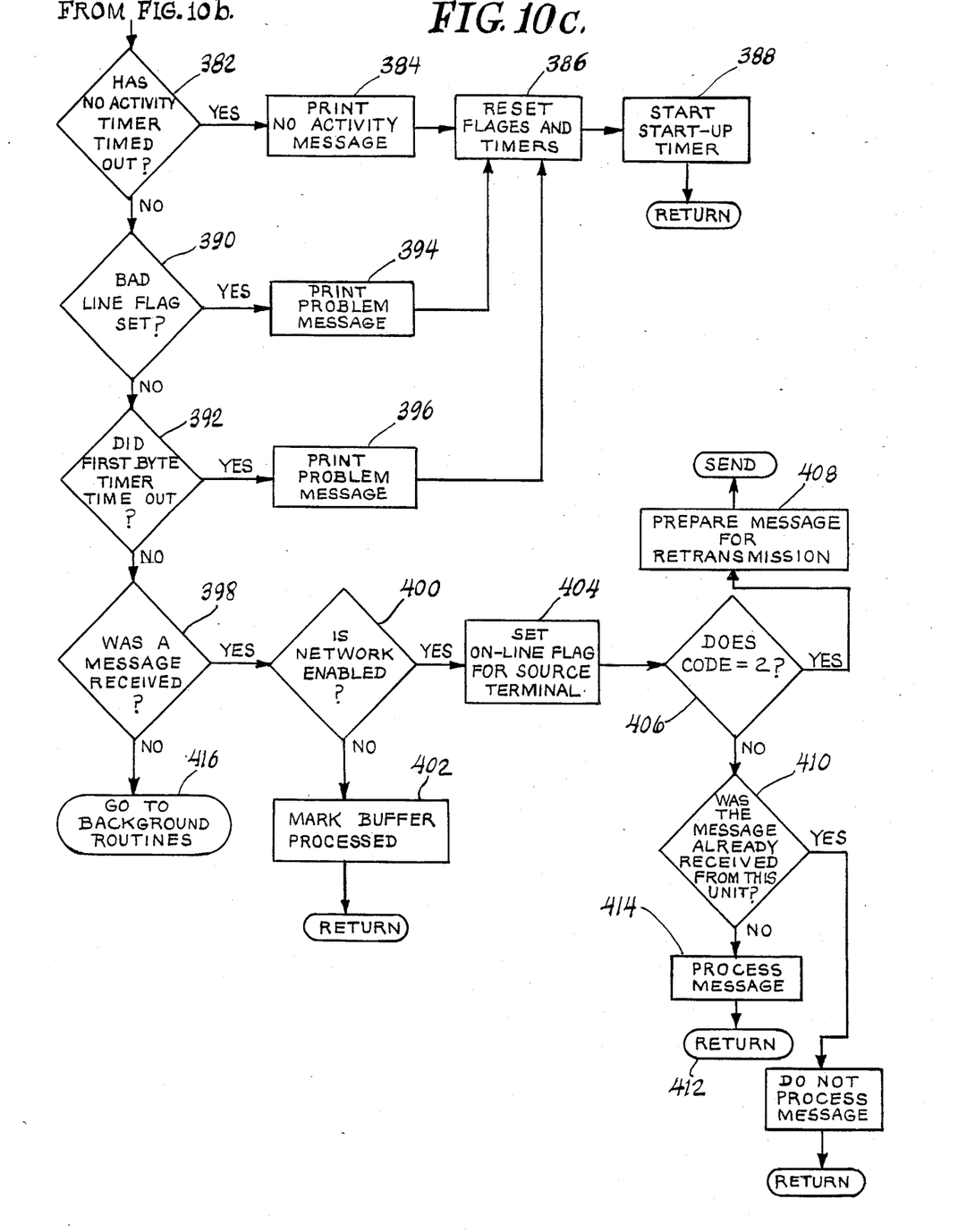

The CPU 230 controls the implementation of the token passing protocol on the communication link 20. Each of the CPU's 230 at each terminal on the communication link 20 is programmed to observe the token passing protocol. This provides for an orderly use of the communication link 20. Referring now to FIGS. 10a-c, a flowchart embodying the programmed instructions for performing the token passing protocol is provided. These flowcharts provide the essence of the token passing routine of this embodiment. The CPU 230 is also programmed at several other levels to perform a variety of other tasks including monitoring a real-time clock, transmitting information, checking the memory, communicating with the printer and the CRT and interacting with the bus line 110.

The flowchart begins with process block 300 where the terminal is enabled by the operator at the CRT 250. To add a new terminal onto a network in operation, each of the terminals in the network must be alerted to the fact that an additional terminal is going to be added into the network. Thereafter, the new terminal may be enabled at its CRT.

In the following block 302, the start-up timer is reset and started. This begins the start-up routine for the terminal. The start-up routine will also be followed when network operation is interrupted and the terminal is reset. The start-up timer is a location in memory which is counted down by the CPU 230. The initial value of the start-up timer is determined by the hardware address of each terminal. The hardware address is set at the networking module 200 by a DIP switch. Each terminal in the network must have a different hardware address. The addresses preferably form a sequence of addresses through the network. Thus, at the beginning of network operation when no messages are being passed between the terminals, each terminal will begin to count down its start-up timer. The first terminal in the network would have the shortest start-up time. When its start-up timer runs out it will take the initiative to transmit a message on the communication link 20 thereby assuming ownership of the "token." Each of the other terminals will receive the message and then ignore their start-up timers. Then, orderly passing of the "token" among the terminals will commence.

The start-up timer is checked at decision block 304. When the timer runs out a flag will be set so that when decision block 304 is reached the yes branch will be followed. Upon leaving decision block 304 the flag will be cleared and will not get set until the next time the start-up timer times out. In the preferred embodiment illustrated in FIG. 10a, the next terminal in line to receive the token will be terminal 0. Process block 306 sets the destination address of the message to 0. If the terminal itself is the terminal with an address of 0 as determined in decision block 308, the next terminal in line will be the terminal with an address of 1 as shown in process block 310. A message containing pages and the token, as shown in FIG. 4A can now be sent out on the communication link. The message is prepared at process block 312, then the send routine 338 is performed. A carrier is brought up on the communication link by the modem 210 according to process block 314. The particular carrier is a function the modem used in the networking module 200. The same carrier signal would be used by all of the terminals on the particular network. The presently preferred modems 210 produce a 1300 cycle carrier signal on the communication link 20.

After the carrier is brought up, a network transmit delay timer is begun in process block 316. This timer provides the delay between putting the carrier on the link and transmitting the data. It is preferably set by the operator to measure a time period somewhere between 40 and 500 milliseconds. When this software timer times out, the network message containing the paging packets is transmitted to all the terminals on the network. At the flowchart level of software, control reverts to the return point 318 located just before decision block 304. The data is transmitted under the direction of another level of software not displayed in the flowchart of FIG. 10.

If the start-up timer has timed out and the "yes" branch was followed clearing the flag, encountering decision block 304 will produce a "no" result. Naturally the no branch is also followed when the start-up timer has not timed out. If a terminal receives a message before the start-up timer times out, the timer will be set to 0 and the flag will remain cleared. Thus, control will be directed down the "no" branch from the decision block 304.

The next branch of the flowchart emanates from decision block 320 which checks the network transmit delay timer. When this timer times out a data receive counter is activated in process block 321. This counter counts the data as it is sent on the communication link. It functions in conjunction with software not illustrated in FIG. 10. When all of the data has been sent, the data receive counter will be used to trigger the termination of the carrier on the communication link 20 so that the next terminal to send a message can take over.

Also when the network transmit delay timer times out, a first byte timer is set in process block 322. The modems 210 of the networking module 200 do not squelch the transmissions which they send out. Rather, these modems 210 receive their own transmissions. If the first byte timer times out before the first byte is received back, the terminal will reset itself after decision block 392 of FIG. 10c. The first byte timer thus helps insure that the communication link 20 is operating properly.

A receive timer operates in the CPU 230 at a level of software not shown in the flowchart. The receive timer is started every time a byte is received by the terminal. The timer is reset when the next byte of information is received. If a byte is not forthcoming before the receive timer reaches a predetermined time, then the message receiving procedure is reset. A notification is printed to the operator that a message was not received. This is shown in the flowchart routine at decision block 324. If a second byte is not received before the receive timer times out through its predetermined time the "yes" branch will be followed. In this case, a count of the receive errors is incremented in process block 326. Then, the receiving procedure is reset in process block 328 to look for the next "start text" byte. At the end of this branch the CPU returns to the return point 318 in the flowchart.

A feature of the invention which is implemented by the program shown in the flowchart is the ability of the terminal with the "token" to make a predetermined number of attempts to transmit the message on the network when the next terminal in the network does not respond with its message. The CPU 230 begins a no-response timer when it sends a message over the communication link 20. It counts down the timer until a message is received from another terminal on the network. The no-response timer is set preferably to a time period five times as long as the time period used by the network transmit delay timer. If the no-response timer times out without the receipt of a message from another terminal, a flag is set. At decision block 330 in the flowchart, control will branch to a retry routine in response to the flag and the flag will be cleared. A predetermined number of retries is set by the operator. At decision block 332, the CPU 230 checks whether the predetermined number of retries has been attempted. If it has not been reached yet, then the number of retries is incremented in process block 334 and a retry is attempted by preparing the message once again for retransmission in process block 336. Control then reverts to the send point 338 in the flowchart where the carrier is brought up on the communication link 20 and the network transmit delay timer is started.

If after the predetermined number of retries no response is obtained from the next terminal in the network, then the CPU 230 branches from decision block 332 to the process block 340 where the non-responsive terminal is marked as being off-line or "down". The CPU 230 then looks to see in decision block 342 if the message that is being transmitted has a code of 0, in other words whether it had been attempting to pass the "token." If so, the destination address for the message will be incremented in process block 344 and the new message will be sent attempting to pass the "token" to the terminal in the network that follows the off-line terminal. If the message which was sent was a request for a retransmit as determined in decision block 346, then before returning to the return point 318 in the flowchart a network token passing flag gets set in process block 348. This returns the control eventually to the routine shown in FIG. 10b which had produced the request for retransmit. If the message was a response to a request for a retransmit then this terminal's responsibility is over since it does not have the "token." Control passes back to return point 318 and the terminal will then be waiting for the next message to be received on the communication link 20.

The next feature in the flowchart is encountered whenever the terminal receives a message containing its address in the destination address. When this occurs, the network token passing flag is set. In the flowchart at decision block 350 when the network token passing flag is set, the CPU 230 will perform the routine shown in FIG. 10b. After completing decision block 350, the network token passing flag is cleared.

The first step taken is to look in decision block 352 at the code in the message which was received to determine whether this message is a request to retransmit. If it is a request to retransmit, the message will be prepared for retransmission in process block 354 and process control returns to the send point 338 at FIG. 10a. If this is not a request for a retransmit then it is either a message passing the "token" or a message in response to a retransmit request. In either case, it is the terminal's turn to pass the "token" on to the next terminal. In the preferred embodiment the next decision block 356 checks whether the terminal had the "token" before. If this is the first time with the "token", then the process block 358 will print out to the operator that the terminal has joined the network. Otherwise, processing will continue down the flowchart.

A table including each of the terminals is maintained in the memory 270. The table is accessed by a table pointer. The table pointer is set to 0 in process block 360. A loop is performed in blocks 362, 364, and 366 whereby each of the terminals is looked at to determine whether it is on-line. If the terminal is on-line, then decision block 368 determines whether a message has been received from that terminal. A message should have been received from all on-line terminals. If a message was received, control proceeds through decision block 364 which checks whether the table pointer has gone through all the terminals in the network. If all the terminals have not been checked yet, the table pointer is incremented in process block 366 and the loop continues. If a terminal is encountered from which a message has not been received the terminal will request a retransmit. The instructions for this are in process block 370. After the message requesting a retransmit has been prepared, it will be sent out on the communication link 20. Control passes to the send routine 338 in FIG. 10a. If the retransmit request does not obtain a response from a terminal after a predetermined number of tries that terminal will be marked as off-line in process block 340.

After it has been determined that messages have been received from all the on-line terminals control passes to process block 372. Here the table is cleared of all the message received bits. The table in this embodiment only keeps records for messages received in a single round through the network. It would be possible if more memory is added to the system that records could be kept for several previous rounds through the network. In such a system, each terminal would also have to keep records of the messages which it sends out in each round. If several messages are missed from a single terminal then these messages could be found in the memory and transmitted on the communication link so that the terminals which did not receive these messages could then process them. Thus, it is the amount of available memory which limits the depths to which past messages are retained in the memories of the terminals.

In normal operation, the "token" will be passed in sequence from one terminal on the network to the next terminal on the network. However, there are occasions where the next terminal on the network is off-line. In such a case, it would be a waste of time to continually attempt passing the "token" to this down terminal. Therefore, if the terminal is down an attempt will not always be made to pass the "token" to it. The terminals are programmed to ignore a down terminal for a certain predetermined number of times indicated in the flowchart at decision block 374 as a recheck value. A token pass counter keeps track of how many times a terminal has taken its turn passing the "token." When the token pass counter becomes equal to the recheck value, the next terminal in sequence will be sent the token regardless of whether it is on or off-line. This operation is performed in process block 376. In this manner, if the recheck value is 10, every 10th round through the token passing routine the down terminals will be rechecked to determine whether they are still down. If it is not the 10th time, then the control will pass through the process block 378 where the destination address in the message is set to the next terminal which is on-line. After determining the destination address, the message is prepared in process block 380 and the message is sent by returning to the send routine 338 in FIG. 10a.

Continuing through the flowchart onto FIG. 10c, each terminal includes a no-activity timer. The no-activity timer is a location in memory which counts down the time from the moment a transmission is detected on the communication link 20. The no-activity timer is preferably set to count a time period fifty times as long as the time period set for the network transmit delay timer. This timer is instrumental in performing the resetting of terminals which have been cutoff from the "token" by a break in the line as shown in FIG. 6. If the no-activity timer times out before another transmission is received, then decision block 382 will direct the CPU 230 to process block 384 which causes a message to print out for the operator indicating that there is no activity on the line. Next all of the flags and timers in the CPU 230 are reset in process block 386. The start-up timer is started in process block 388 and control is transferred back to the return point 318. In a situation such as that shown in FIG. 6, if several terminals are cutoff from the "token," they will all be reset as a result of their no-activity timers and the start-up procedure will take place as if all of these terminals were first being enabled.

A resetting of the flags and timers and the restarting of the start-up timer is also caused when a bad line is detected in decision block 390 or when the first byte timer times out before receiving back the first byte sent out on the communication link. At another level of software, any messages which are sent out are compared with the message when it is received. If the message was garbled in the transmission over the communication link, the comparison will show that the message was altered and the bad line flag will be set. Messages are printed at the CRT for the operator's information in process blocks 394 and 396 to indicate why the terminal is being reset.

The final branch of the flowchart in FIG. 10c is taken when a message is received as determined by decision block 398. If a message is received, then decision block 400 determines whether the network has been enabled. When a terminal is first being brought on-line, the operator will want to watch the network in operation to be sure the terminal is receiving the messages properly. So there may be times when a terminal is passively watching the network, rather than participating. When a terminal receives messages they are placed in a buffer. Thus, if the network is not enabled process block 402 will mark the buffer processed since the terminal doesn't need to process the messages unless it is enabled. If the network is enabled, then the terminal identified in the source address of the message is marked as on-line in process block 404.

The code of the received message is looked at and if it is a 2 then a retransmit is being requested. Decision block 406 handles this question and when a retransmit is requested it passes control to process block 408 which prepares the previously sent message for retransmission. After which control is transferred to the send routine 338 at FIG. 10a.

If this is not a request for a retransmit then it is a message which contains pages. The next decision block 410 checks on whether this message has already been received or not. If it has already been received, then the message does not need to be processed. Process block 412 avoids the processing of this message by resetting the pointers which access the buffer. If it is the first time the message has been received then process block 414 instructs the machine to process this message. One task performed when processing the message is to set a flag for the terminal which sent the message in the table being kept in the memory 270. After this incoming message has been dealt with by either processing it or not, control returns to the return point 318 of the flowchart.

If control reaches decision block 398 and a message has not been received, then the end of the flowchart has been reached and control will be directed to the performance of background routines 416. There are a variety of background routines which are performed when the CPU 230 has the time. These routines include sending and receiving data from the CRT 250 and the printer 240, sending and receiving data from the bus 110, operating a real-time clock and diagnostic checks on memory. RAM is checked by writing into a row of locations and then reading from those locations, performing a cyclic redundancy check on the bits as they are read. Control is transferred from background routines to the flowchart program level through interrupts. Interrupts are triggered by a number of different occurrences. Some of these include a timer timing out, receiving data on the network, a request from the bus line 110, and inputs from the CRT 250. There are several programmed functions which are performed under interrupt control. Included among these are outputting messages onto the communication link 20 and outputting information onto the bus line 110.

As seen from the above description, the software provided at each terminal in the network enables the network to operate smoothly in accordance with the token passing protocal. Each terminal which is in operation on the communication link receives its turn with the hypothetical token. Thus, pages from each terminal in the network have the opportunity to be broadcast inter-regionally. Terminals with the "token" will make sure that they have received messages from each of the other terminals in the past round through the network. This insures that pages from all on-line terminals will be sent to each of the other on-line terminals even if there was a disturbance on the communication link at some of the terminals during the initial transmission on the link.

Of course, it should be understood that various changes and modifications to the preferred embodiments described above will be apparent to those skilled in the art. For example, different paging terminals may be used to perform the local paging function. Also, any number of different algorithms might be used to perform the token passing protocol of the present invention. These and other changes can be made without departing from the spirit and the scope of the invention and without diminishing its attendant advantages. It is therefore intended that such changes and modifications be covered by the following claims.

We claim:

1. A network of paging terminals, each terminal interfacing with a telephone system and responding to telephone calls by transmitting pages in a locality serviced by said terminal, comprising:
 a multi-drop communication link connected to each of said paging terminals;
 means, at each of said paging terminals, for producing a message containing a page and a paging group address to identify from which of said terminals transmission of said page is desired;
 means, at each of said paging terminals, for sending each of said messages on said communication link; and
 means for establishing an orderly use of said communication link by including a destination address in each of said messages to indicate to all of said paging terminals which terminal has a responsibility to send the next message on said communication link.

2. The network of claim 1 further comprising:
 means for any of said terminals to request another terminal to retransmit a message, said request means including sending a message containing a request code.

3. The network of claim 1 wherein said message further includes a source address for identifying the terminal which produced said message.

4. The network of claim 1 further comprising:
 no response timer means at each of said paging terminals to count the time that elapses after the terminal containing said no response timer means sends a message on said communication link, upon said no response timer counting to a predetermined amount of time prior to said terminal receiving a message from another terminal on said communication link, said terminal will send the message on said communication link again.

5. The network of claim 1 wherein each of said paging terminals further comprises:
 means for reading the paging group address for each page included in messages received on said communication link; and
 means for transmitting pages having a paging group address corresponding to said paging terminal.

6. The network of claim 5 wherein each of said paging terminals further comprises:
 means for comparing pages received from said communication link with information stored in said terminal to detect a page that has a tone sequence identical to the tone sequence of a pager in the locality serviced by the terminal and for preventing the transmission of a page if an identical tone sequence is detected.

7. The network of claim 1 wherein said communication link is half duplex.

8. A network of paging terminals, each terminal interfacing with a telephone system and responding to telephone calls by transmitting pages in a locality serviced by said terminal, comprising:
 a half duplex multi-drop communication link connected to each of said paging terminals;
 means, at each of said paging terminals, for receiving a message from said communication link, said message including a destination address to identify the paging terminal in said network which has a responsibility to send the next message on said communication link; and
 means, at each of said paging terminals, for sending a message on said communication link in response to receiving a message on said communication link having a destination address identifying said terminal as the terminal with the responsibility to send the next message.

9. The network of claim 8 wherein each paging terminal further comprises:
 startup timer means for counting through a predetermined amount of time, so that in response to said startup timer means counting out the entire predetermined amount of time before a message is received from said communication link, said means for sending a message sends a message on said communication link.

10. The network of claim 9 wherein each paging terminal further comprises:
 no activity timer means for counting the time that elapses after a message is received by said terminal, said no activity timer means being reset upon said terminal receiving a message from said communication link and said startup timer means being reset and started upon said no activity timer means counting to a predetermined amount of time.

11. The network of claim 8 wherein one of the terminals in said network comprises a billing terminal for collecting information from each of said terminals in said network to produce a record of the time used by each subscriber on the network so that bills can be prepared to charge each subscriber for time used on the network.

12. The network of claim 8 wherein each of said paging terminals comprises means for receiving the message which itself sends out on the communication link and means for comparing the received message with the message which was sent.

13. A network of paging terminals, each terminal interfacing with a telephone system and responding to telephone calls by transmitting pages in a locality serviced by said terminal, comprising:
- a multi-drop communication link connected to each of said paging terminals;
- means, at each of said paging terminals, for producing messages, each message including a page and a paging group address to identify the terminal for transmitting said page;
- means, at each of said paging terminals, for sending each of said messages on said communication link; and
- token passing means for giving each terminal a turn to use said communication link, wherein the turn of a terminal includes:
- requesting transmissions from terminals from which a message was not received since the previous turn of said terminal, and
- sending one of said messages on said communication link, said one of said messages including means for identifying the next terminal to get a turn on said communication link.

14. The network of claim 13 further comprising:
- no response timer means at each of said paging terminals to count the time that elapses after the terminal containing said no response timer means sends a message on said communication link, upon said no response timer counting to a predetermined amount of time prior to said terminal receiving a message from another terminal on said communication link, said terminal will send the message on said communication link again.

15. The network of claim 13 wherein each of said paging terminals further comprises:
- means for reading the paging group address for each page included in messages received on said communication link; and
- means for transmitting pages having a paging group address corresponding to said paging terminal.

16. The network of claim 15 wherein each of said paging terminals further comprises:
- means for comparing pages received from said communication link with information stored in said terminal to detect a page that has a tone sequence identical to the tone sequence of a pager in the locality serviced by the terminal and for preventing the transmission of a page if an identical tone sequence is detected.

17. The network of claim 13 wherein each of said paging terminals comprises means for receiving the message which itself sends out on the communication link and means for comparing the received message with the message which was sent.

18. A method for causing a first paging terminal to automatically participate with a plurality of additional paging terminals in an inter-regional paging network in which each paging terminal services a locality, comprising:
- providing a multi-drop communication link to connect said first paging terminal with said plurality of additional paging terminals;
- receiving messages on said communication link;
- identifying within said received messages pages that are addressed for transmission in the locality serviced by said first paging terminal;
- transmitting the identified pages in the locality serviced by said first paging terminal;
- identifying a destination address within one of said received messages corresponding to said first paging terminal; and
- sending a message on said communication link in response to identifying the destination address corresponding to said first paging terminal.

19. The method of claim 18 further comprising:
- identifying a code in one of said received messages indicating that a retransmission is requested; and
- sending a previously sent message on said communication link in response to identifying a code requesting a retransmission.

20. The method of claim 18 wherein messages sent on said communication link include a source address identifying the terminal from which the message was sent.

21. The method of claim 20 further comprising:
- reading the source address in messages received from said communication link;
- setting a flag for each terminal identified in the source address of received messages; and
- requesting a retransmission from a terminal in the network for which a flag was not set.

22. The method of claim 18 further comprising:
- counting the time that elapses after sending a message on said communication link; and
- if a message from another terminal is not received on said communication link before said counting reaches a predetermined amount of time, sending said message on said communication link again.

23. The method of claim 22 further comprising:
- if said message is sent on said communication link a predetermined number of times, then changing the destination address in said message to form a new message and sending said new message on said communication link.

24. A paging terminal that receives a call from a telephone and transmits a page for receipt by a pager assigned to a subscriber identified by the call, comprising:
- trunk module means connected with a telephone system for answering a phone call and creating a paging packet;
- master memory means for storing information corresponding to each subscriber and for supplying said trunk module means with the information corresponding to the subscriber identified by the phone call;
- output means for receiving the paging packet from said trunk module means and for converting the paging packet into a page which can be transmitted; and
- network module means for receiving the paging packet from said trunk module means, producing a message containing the paging packet and providing the message to a network of paging terminals which observes a protocol for taking turns sending messages on a communication link which interconnects the network, said network module means including:
- a modem connected to said communication link for receiving and transmitting messages on said link;

a serial input/output device connected to said modem for converting serial data received from said modem into a parallel format;

a parallel input/output device for receiving the paging packet from said trunk module means; and a central processor means connected to said parallel input/output device for producing the message for transmission on said communication link and for recognizing from data provided by said serial input/output device when a message may be transmitted on said communication link according to the protocol of the network.

25. The paging terminal of claim 24 wherein said central processor means further includes:

startup timer means for counting down a predetermined amount of time, so that in response to said startup timer means counting down the entire predetermined amount of time prior to a message being received on said communication link, said central processor means directs the transmission of a message on said communication link.

26. The paging terminal of claim 25 wherein said central processor means further includes:

no activity timer means for counting the time that elapses after said modem receives a message, said no activity timer means being reset upon said modem receiving another message on said communication link, and said startup timer means being reset and started upon said no activity timer means counting to a predetermined amount of time.

27. The paging terminal of claim 24 wherein said central processor means further includes:

no response timer means for counting a predetermined amount of time after said network module means transmits a message on said communication link; and means for retransmitting the message transmitted on said communication link upon said no response timer means counting to the end of its predetermined amount of time prior to a message from another terminal being received on said communication link.

28. The paging terminal of claim 27 wherein the message produced by said central processor means includes a destination address to indicate which terminal has the next turn to transmit on said communication link.

29. The paging terminal of claim 28 wherein said central processor means further includes:

means for counting the number of times the message is transmitted and retransmitted; and means for changing the destination address in the message after said counting means accumulates to a predetermined number.

30. The paging terminal of claim 29 wherein said central processor means further includes:

means responsive to said counting means accumulating the predetermined number, for indicating that the terminal identified by the destination address in the message which was being counted is down, so that said central processor means will not use the address of said down terminal in the destination address of messages for a next predetermined number of rounds through the network.

31. A paging terminal including means for interfacing with a telephone system, memory means for storing subscriber information, means for processing pages to be transmitted locally by said terminal, and a bus line connecting said interfacing means, said memory means and said processing means, the improvement comprising:

a modem for transmitting and receiving messages on a communication link connecting a plurality of paging terminals, each servicing a different locality;

a parallel input/output device connected to said bus line for sending and receiving pages; and a central processing unit including:

means for identifying pages in messages received by said modem which are to be transmitted in the locality of the paging terminal, means for delivering pages, identified by said identifying means, to said parallel input/output device, means for preparing pages, received on said bus line by said parallel input/output device, for transmission to the plurality of paging terminals, and means for evaluating messages received by said modem to determine when said terminal may transmit pages on said communication link.

32. The paging terminal of claim 31 wherein said modem brings up a carrier on said communication link.

33. A module for connection with a paging terminal to enable said terminal to participate on a communication link with an inter-regional paging network comprising:

a modem for connection with said communication link;

processor means for controlling the transmitting of messages containing pages onto said communication link in conformity with a token passing protocol observed by the inter-regional paging network;

a serial input/output device connected between said modem and said processor means; and a parallel input/output device fo connection with said paging terminal, said parallel input/output device being controlled by said processor means.

34. A module for connection with a paging terminal servicing a locality to enable said terminal to participate on a communication link with an inter-regional paging network comprising:

a modem for connection with said communication link to transmit and receive messages;

processor means for controlling the transmitting and receiving of messages containing pages on said communication link, said processor means including, means for identifying within messages received on said communicaton link pages that are addressed for transmission in the locality serviced by said terminal;

means for identifying a destination address within one of said received messages corresponding to said terminal; and means for delivering a message to said modem for transmission on said communication link in response to identifying the destination address corresponding to said terminal;

a serial input/output device connected between said modem and said processor means; and a parallel input/output device for delivering from said modem to said terminal, pages identified by said processor means for transmission in the locality serviced by said terminal.

* * * * *

UNITED STATES PATENT AND TRADEMARK OFFICE
CERTIFICATE OF CORRECTION

PATENT NO. : 4,577,060
DATED : March 18, 1986
INVENTOR(S) : ROBERT E. WEBB, EUGENE H. KREEFT, and JACK T. ARNOLD It is certified that error appears in the above-identified patent and that said Letters Patent is hereby corrected as shown below:

In the specification:

column 1, line 35, at the first occurrence of "in", delete "in" and insert --an-- therefor;

column 4, line 10, delete "restransmit" and insert --retransmit-- therefor;

column 6, line 31, at the second occurrence of "of", delete "of" and insert --in-- therefor;

column 10, line 36, delete "it turns" and insert --its turn-- therefor;

column 10, line 39, delete "in" and insert --on-- therefor;

column 10, line 48, delete "moden" and insert --modem-- therefor;

column 17, line 16, delete "protocal" and insert --protocol-- therefor.

Claim 33, line 13, delete "fo" and insert --for-- therefor.

Signed and Sealed this

Twentieth Day of September, 1988

Attest:

DONALD J. QUIGG

*Attesting Officer*  *Commissioner of Patents and Trademarks*